United States Patent [19]

Ingrey et al.

[11] 4,010,051
[45] Mar. 1, 1977

[54] BEDDING OF LOAD-CARRYING MEMBERS ON LOAD-SUPPORTING FOUNDATIONS

[75] Inventors: Michael H. Ingrey; Donald J. Watson, both of Chessington, England

[73] Assignee: Corrosion Technical Services Limited, Brentford, England

[22] Filed: Sept. 4, 1975

[21] Appl. No.: 610,346

[30] Foreign Application Priority Data

Sept. 9, 1974   United Kingdom ............ 39215/74

[52] U.S. Cl. .............................. 156/71; 156/330; 264/299; 264/337; 404/26
[51] Int. Cl.[2] .......................................... E03F 5/02
[58] Field of Search ............... 404/25, 26; 264/259, 264/267, 299, 337

[56] References Cited

UNITED STATES PATENTS

| | | | |
|---|---|---|---|
| 1,852,928 | 4/1932 | Helling | 404/26 |
| 2,962,409 | 11/1960 | Ludlow et al. | 264/259 |
| 3,490,577 | 1/1970 | Grikscheit | 264/337 |

*Primary Examiner*—Edward G. Whitby
*Attorney, Agent, or Firm*—Sughrue, Rothwell, Mion, Zinn & Macpeak

[57] ABSTRACT

A method of bedding a load-carrying member on a supporting foundation in which one or more open-ended axially compressible moulds are placed on the foundation and a bonding agent which includes a thermosetting resin capable of bonding to both the underside of the member and to the foundation is placed in the mould or moulds. The member is then placed on the mould or moulds and, by its own weight, or by a superimposed load, compresses the mould or moulds axially until the member is itself pressed into contact with the bonding agent, which is contained laterally by the mould or moulds, the bonding agent then being allowed or caused to harden. The method is particularly useful for bedding manhole covers on a manhole wall.

An apparatus for carrying out the method comprises a number of open-ended axially compressible moulds, a container containing a liquid synthetic resin and an accelerator and a second container containing a mixture comprising a granular filler, which is inert to synthetic resin, and a hardening catalyst for the resin.

8 Claims, 3 Drawing Figures

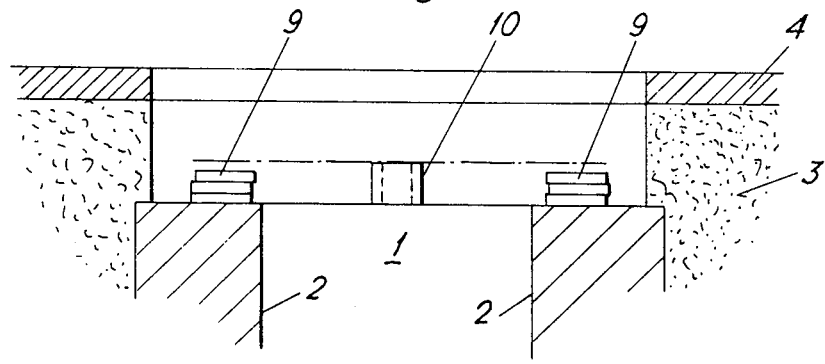
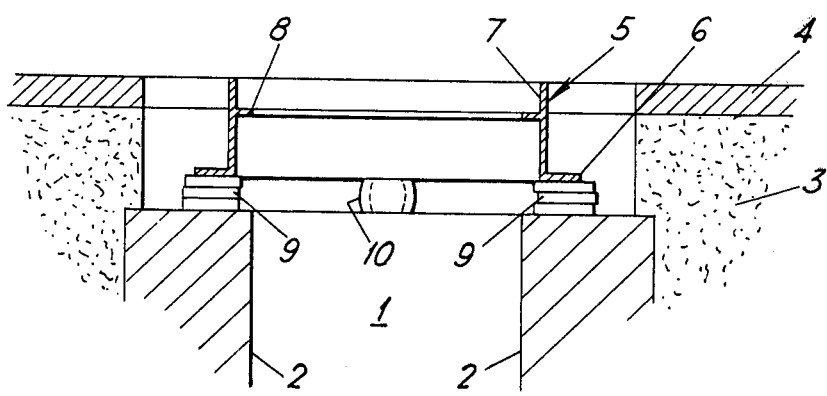

BEDDING OF LOAD-CARRYING MEMBERS ON LOAD-SUPPORTING FOUNDATIONS

This invention relates to methods of, and apparatus for, bedding load-carrying members on load-supporting foundations, for example the bedding of manhole cover frames on manhole walls or machinery base plates on concrete foundations.

When a road is re-surfaced by the application to it of an additional layer of asphalt, or tar or bitumen macadam, it is necessary to raise the surface fittings in the road, such as manhole covers and their frames, cats eyes and valve surface boxes to make them flush with the new road surface. To do this the fittings must be removed and then bedded down again on their supporting foundations at their new levels. It is generally necessary to re-open the road to traffic after a re-surfacing operation with a minimum delay and it is therefore desirable that the fittings, after re-bedding should be able to be subjected to traffic loads as soon as possible.

Similarly, if a grout bedding of a machine base plate on a concrete foundation is cracked or otherwise damaged, for instance by vibration, the base plate must be re-bedded on the foundation and again it is generally desirable to be able to put the machine back into service quickly.

The aim of the present invention therefore is to provide a method of bedding a load-carrying member on a supporting foundation in such a way that the member may quickly be subjected to extraneous loading after the bedding operation. The invention also provides apparatus for carrying out this method.

According to this invention, in such a method, one or more open-ended axially compressible moulds are placed on the foundation, a bonding agent which includes a thermosetting resin capable of bonding to both the underside of the member and to the foundation is placed in the mould or moulds, the member is placed on the mould or moulds and, by its own weight, or by a superimposed load, compresses the mould or moulds axially until the member is itself pressed into contact with the bonding agent, which is contained laterally by the mould or moulds and the bonding agent is then allowed or caused to harden.

The bonding agent preferably comprises a polyester resin with a major proportion of inert filler, for example of graded silica, together with the usual accelerator and hardening catalyst which is mixed with the bonding agent directly before it is placed in the mould or moulds. Such polyester resins can be formulated to have an initial set after about twenty minutes from the admixture of the hardening catalyst at ambient summer temperatures and they are then capable of accepting a full load after only 1 hour. The compressive strength of such bonding agents may for example be about 10,000 p.s.i. Alternatively a quick-setting epoxy resin composition or a polyurethane composition may, for example, be used.

Because the bonding agent becomes load sustaining so quickly and also because of its bond to both the load-carrying member and the foundation, the member can be subjected to extraneous loads as soon as the bonding agent has hardened sufficiently, which may as already mentioned be within about 1 hour.

The axially compressible mould or moulds, the provision of which in combination with the bonding agent forms the essence of the present invention, have a number of important advantages. The first is that the use of the mould or moulds results in considerable economy in the amount of bonding agent necessary since the whole of the bonding agent can be confined in an effective position between the load-carrying member and the foundation. In the absence of the mould or moulds, a considerable proportion of the bonding agent will spew out at the sides of the joint between the member and the foundation, even when the distance between the underside of the member and the foundation is relatively small. Secondly, as the mould, or each mould, is compressed axially and the member is pressed into contact with the upper surface of the bonding agent in the mould, the bonding agent is itself subjected to pressure at the faces of contact between the bonding agent and the member and the bonding agent and the foundation. This ensures that a satisfactory bond can be achieved. In the absence of a mould, little or no pressure can be build up at these faces of contact because the bonding agent is in the form of a viscous liquid which will flow laterally when subjected to pressure. Thirdly the presence of the mould or moulds enables the thickness of the bonding agent between the member and the foundation to be much greater than is possible if the bonding agent is uncontained. This is of the greatest importance in, for example, the rebedding of surface fittings in roadways after re-surfacing because, as already explained, the fittings must be set at a new level which is above the foundation by a distance at least equal to the thickness of the additional road surfacing which is commonly about 2 inches.

The number and cross-sectional areas of the moulds will be dependent upon the base area of the load-carrying member and of the foundation upon which it is to be bedded. Generally speaking, though, in order to economize in the volume of bonding agent used, it is preferred, when bedding a load-carrying member of substantial area, to use a number of moulds which are placed on the foundation in positions laterally spaced apart from each other and then have the bonding agent placed in them. Each mould is then preferably of a relatively small cross-sectional area compared with the base area of the load-carrying member.

For ease of preparation of the bonding agent, the synthetic resin in a liquid state together with its usual admixture of an accelerator or accelerators is preferably contained in one container and a mixture comprising a granular filler which is inert to the synthetic resin and a hardening catalyst are contained in a second container. The contents of the two containers are then mixed together to form the bonding agent and this is placed in the moulds.

To enable this simple technique to be carried out, according to another aspect of the invention, apparatus for carrying out the method in accordance with the invention comprises a number of open-ended axially compressible moulds, a container containing a liquid synthetic resin and an accelerator and a second container containing a mixture comprising a granular filler, which is inert to the synthetic resin, and a hardening catalyst for the resin.

The compressibility of the mould or moulds is dependent to some extent upon the magnitude of the weight of the load-carrying member or of any load which is imposed upon the member and it is of course essential that the mould should be sufficiently compressible to allow the underside of the member to come into contact with the bonding agent in the mould. It is equally, of course, essential that the mould should not be destroyed or damaged to such an extent that the bonding agent can escape laterally from it when the mould is compressed. It has been found that moulds of foamed plastics material are particularly satisfactory and foamed polyurethane is preferably used, particularly when the bonding agent contains a polyester resin. Moulds of foamed polystyrene may also be used when other bonding agents which do not attack this material.

To avoid having to adjust the axial compressibility of the mould or moulds in dependence upon the weight of the load-carrying member or upon the magnitude of any load superimposed on the member to ensure that the member is set at the correct level after the mould or moulds have been compressed, according to a preferred feature of the invention, one or more relatively rigid load-carrying supports of smaller heights than the mould or moulds are preferably placed on the foundation beside or between the mould or moulds. The, or each, mould is then filled with bonding agent to a level above the top of the support or supports and then the load-carrying member is placed so that it extends both over the mould or moulds and over the support or supports. The member compresses the mould or moulds axially and squeezes the bonding agent laterally outwards to expand the mould or moulds laterally until the member rests on the support or supports. The support or supports then carry that part of the weight of the member which is not supported by the mould or moulds and the bonding agent. The relatively rigid support or supports give lateral stability to the member while the bonding agent is hardening and thus when one or more supports are provided, the height at which the member is bedded above the foundation can be increased still further.

An example of a method in accordance with the invention applied to the re-bedding of a manhole cover frame on the top of a manhole wall in a roadway and an example of apparatus in accordance with the invention will now be described with reference to the accompanying drawings, in which:

FIG. 2 is a section through the manhole and of the adjacent part of the roadway as seen in the direction of the arrows on the line II—II in FIG. 1; and, FIG. 3 is a section similar to FIG. 2, but showing the manhole cover frame in position on top of the manhole wall.

Figure 1:
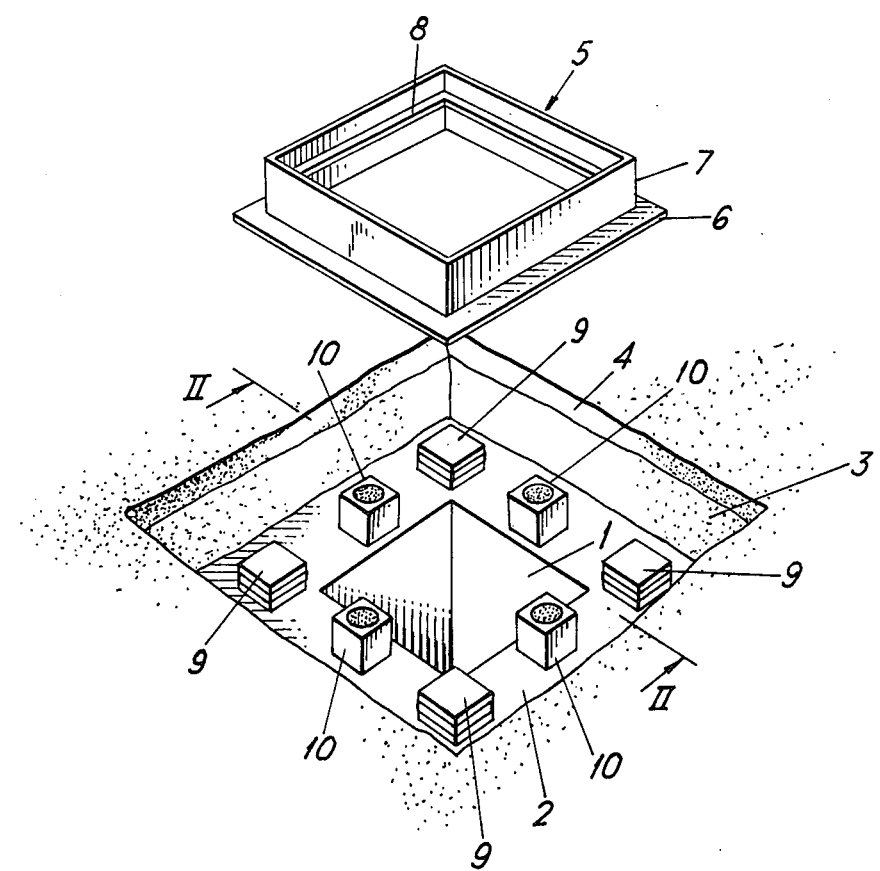
FIG. 1 is a somewhat diagrammatic exploded perspective view of the top of a manhole with the adjacent part of a roadway in which the manhole is located and a manhole cover frame.

A manhole 1 is surrounded by a brick or concrete wall 2. The manhole is located in a roadway having metalling 3 to which an additional surface layer of tarmac 4 approximately 2 inches thick has been added.

A manhole cover frame 5 has a base flange 6 and an upwardly projecting flange 7 provided with a ledge 8 for supporting a manhole cover. Initially the frame 5 was bedded on the wall 2 with the upper edge of the flange 7 flush with the top of the metalling 3. In order to re-bed the frame 5 with the top edge of the flange 7 flush with the upper surface of the tarmac layer 4, the metalling 3 and the tarmac layer 4 are cut back as shown to the outer periphery of the wall 2 clear of the flange 6 and the frame is removed. The top of the wall 2 is then cleaned of mortar and debris and cut back as necessary to provide a level surface of sound material.

Four stacks of load-bearing tiles 9, which form rigid supports, are then placed on top of the wall 2 with one stack at each corner of the manhole 1. The heights of the stacks 9 are adjusted so that when the flange 6 is resting on them, the upper edge of the flange 7 is flush with the upper surface of the tarmac layer 4. To achieve this each stack of tiles is approximately 2½ inches in height.

Next four moulds 10 of foamed polyurethane are placed on top of the wall 2 in the centers of the sides of the manhole 1, that is midway between the stacks of tiles 9. Each of the moulds 10 is tubular and is 4 by 4 inches in cross-section and 3 inches high with an open-ended hole 2½ inches in diameter through its center.

The ingredients of a bonding agent in the form of a polyester concrete are packed in two tins, one of which contains a standard unsaturated polyester resin mixed with an amine accelerator and the other of which contains a filler in the form of a graded silica aggregate mixed with benzoyl peroxide, which forms a hardening catalyst for the polyester resin, in an amount equal to 10% by weight of the resin in the first container. The filler consists of 50% by volume of silica sand graded from ¼ inch to ⅛ inch and 50% of a mixture of silica sand and silica flour. The mixture consists of two parts 16/32 grading silica sand, 1 part Redhill F sand and 1 part silica flour. One part of resin and accelerator by weight from the first container is mixed thoroughly with 8 parts by weight of the filler and catalyst from the second container. The moulds 10 are then filled to a level just below their tops and above the tops of the stacks of tiles 9 with the mixture prepared as just described.

As soon as the moulds 10 have been filled with the polyester concrete forming the bonding agent, the frame 5 is placed in position as shown in FIG. 3 so that the flange 6 rests both on the stacks of tiles 9 and on the moulds 10. The moulds 10 are axially compressed as shown in FIG. 3 by the weight of the frame 5 and in being compressed the moulds 10 are caused to bulge laterally. Owing to the axial compression and bulging of the moulds 10, the polyester concrete in the moulds is held under pressure and this pressure presses it against the underside of the flange 6 and against the top face of the wall 2.

After this the remainder of the gap between the flange 6 and the top of the wall 2 is filled from the inside with mortar which is finished flush with the internal face of the wall 2 and the gap between the frame 5 and the road metalling 3 and the tarmac 4 is either filled with concrete up to the top surface of the metalling 3 and above this with tarmac or alternatively the whole of the gap may be filled with tarmac flush with the upper surface of the tarmac layer 4 and the upper edge of the flange 5.

After approximately an hour, in dependence upon the ambient temperature, the polyester concrete in the moulds 10 is sufficiently hard to support traffic loads on the cover of the manhole 8 even though the mortar and concrete if any are still unhardened and accordingly the manhole cover can be placed in position and the road re-opened to traffic.

We claim:

1. A method of bedding a load-carrying member on a supporting foundation comprising the steps of:

a. providing at least one axially compressible mould having two open ends;

b. placing one of said open ends of said mould on said foundation with the other of said open ends directed upwardly;
c. providing a bonding agent, said bonding agent including a thermosetting resin capable of bonding to both the underside of said member and to said foundation;
d. placing said bonding agent in said mould;
e. placing said member on said upwardly directed open end of said mould filled with said bonding agent after said mould has been placed on said foundation;
f. causing said member to compress said mould axially until said member is itself pressed into contact with said bonding agent through said upwardly directed open end, and said bonding agent is pressed into contact with said foundation through one of said open ends;
g. containing said bonding agent laterally by said mould; and,
h. effecting hardening of said bonding agent.

2. The method of claim 1, wherein step (a) comprises providing a plurality of said moulds; step (b) comprises placing said plurality of moulds on said foundation in positions laterally spaced apart from each other; step (d) comprises placing said bonding agent in all of said moulds; and step (e) comprises placing said member on all of said moulds.

3. The method of claim 2, wherein said load-carrying member is a manhole cover frame and wherein said foundation is a manhole wall, said moulds being spaced apart around the top of said manhole wall.

4. The method of claim 2, further including the steps of placing at least one relatively rigid load-carrying support on said foundation with said plurality of moulds, the heights of said at least one support being less than the height of said moulds and said bonding agent in said moulds being above the level of said support, and placing said load-carrying member so that it extends over said moulds and said support, whereby said member is supported by both moulds and said support.

5. The method of claim 1, wherein said bonding agent comprises a polyester resin, a major proportion of inert filler, an accelerator, and a hardening catalyst, said resin and said catalyst being mixed together directly before said bonding agent is placed in said mould.

6. The method of claim 5, wherein said filler is graded silica granules.

7. The method according to claim 5, wherein said mould comprises an open-ended tube, said tube being formed of foamed plastics material.

8. The method of claim 7, wherein said plastics material is polyurethane.

* * * * *